US012597095B2

(12) United States Patent (10) Patent No.: US 12,597,095 B2
Sharma (45) Date of Patent: Apr. 7, 2026

(54) INTELLIGENT SYSTEM AND METHOD OF ENHANCING IMAGES

(71) Applicant: Microsoft Technology Licensing, LLC, Redmond, WA (US)

(72) Inventor: Mrinal Kumar Sharma, Jharkhand (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 412 days.

(21) Appl. No.: 18/179,540

(22) Filed: Mar. 7, 2023

(65) Prior Publication Data

US 2024/0303775 A1 Sep. 12, 2024

(51) Int. Cl.
*G06T 5/50* (2006.01)
*G06T 7/00* (2017.01)
*G06V 10/74* (2022.01)

(52) U.S. Cl.
CPC .............. *G06T 5/50* (2013.01); *G06T 7/0002* (2013.01); *G06V 10/761* (2022.01);
(Continued)

(58) Field of Classification Search
CPC ... G06T 2207/30168; G06T 5/60; G06T 5/00; G06T 5/94; G06T 7/0002; G06V 10/764;
(Continued)

(56) References Cited

U.S. PATENT DOCUMENTS 7,933,454 B2 * 4/2011 Bressan .................... G06T 5/00
382/254
9,569,697 B1 * 2/2017 McNerney .............. G06F 18/22
(Continued)

FOREIGN PATENT DOCUMENTS

CN 103353890 A 10/2013
WO WO-2022154167 A1 * 7/2022

OTHER PUBLICATIONS

Kawano, Y., Yanai, K. Automatic Expansion of a Food Image Dataset Leveraging Existing Categories with Domain Adaptation. Agapito, L., Bronstein, M., Rother, C. Computer Vision—ECCV 2014 Workshops. ECCV 2014. Lecture Notes in Computer Science(vol. 8927). Springer, Cham. (Year: 2014).*

(Continued)

*Primary Examiner* — John B Strege
*Assistant Examiner* — Chandhana Pedapati
(74) *Attorney, Agent, or Firm* — NovoTechIP International PLLC

(57) ABSTRACT

A system and method and for automatically enhancing an input image includes detecting a genre for the input image using a genre identification machine-learning model and identifying one or more objects in the input image using an object identification machine-learning model. The identified genre and objects are then compared to a list of genre and object tags for images in an image library to identify a plurality of genre and object tags that are similar to the identified genre and objects. A list of edits corresponding to each of the identified similar genre and object tags is then to the input image to generate a plurality of enhanced images for the input image. An aesthetic value is measured for the plurality of enhanced images and at least one of the plurality of enhanced images is provided as a recommendation for enhancing the input image, based on the aesthetic value.

20 Claims, 10 Drawing Sheets

(52) U.S. Cl.
CPC ............... *G06T 2207/20081* (2013.01); *G06T 2207/20084* (2013.01); *G06T 2207/30168* (2013.01)

(58) Field of Classification Search
CPC ...... G06V 10/82; G06V 10/774; G06V 20/70; G06V 20/00
See application file for complete search history.

(56) References Cited

U.S. PATENT DOCUMENTS

| | | | | |
|---|---|---|---|---|
| 11,574,630 | B2 * | 2/2023 | Ganz | G06T 7/0002 |
| 11,769,528 | B2 * | 9/2023 | Patterson | G11B 27/031 |
| | | | | 386/278 |
| 2003/0113017 | A1 * | 6/2003 | Thomas | G06V 10/40 |
| | | | | 707/E17.026 |
| 2012/0269441 | A1 * | 10/2012 | Marchesotti | G06F 18/253 |
| | | | | 382/195 |
| 2013/0265451 | A1 * | 10/2013 | Son | H04N 23/62 |
| | | | | 348/207.1 |
| 2018/0225812 | A1 | 8/2018 | Diverdi | |
| 2020/0258276 | A1 | 8/2020 | Ayush et al. | |
| 2022/0082821 | A1 * | 3/2022 | Solomon | H04N 23/81 |
| 2023/0188831 | A1 * | 6/2023 | Hyun | G06T 7/194 |
| | | | | 348/207.1 |

OTHER PUBLICATIONS

Dahal, et al., "USRRM: Pairwise Ranking and Scoring Images Using its Aesthetic Quality", IEEE Access, vol. 7, Sep. 24, 2019, pp. 141171-141178.

International Search Report and Written Opinion received for PCT Application No. PCT/US2024/017936, Jun. 18, 2024, 14 pages.

Chen, et al., "Photo Filter Recommendation Through Analyzing Objects, Scenes and Aesthetics", In Proceedings of IEEE Fifth International Conference on Multimedia Big Data, Dec. 5, 2019, pp. 252-256.

Chu, et al., "Photo Filter Classification and Filter Recommendation without Much Manual Labeling", In Proceedings of IEEE 21st International Workshop on Multimedia Signal Processing, Sep. 27, 2019, 6 Pages.

Sun, et al., "Photo Filter Recommendation by Category-Aware Aesthetic Learning", In Proceedings of IEEE Transactions on Multimedia, Mar. 29, 2017, 11 Pages.

International Preliminary Report on Patentability (Chapter I) received for PCT Application No. PCT/US2024/017936 mailed on Sep. 18, 2025, 09 Pages.

* cited by examiner

300A

| Input Image | Aesthetic Values |
|---|---|
|  | Balancing: 0.0717<br>Harmony: 0.367<br>Content: 0.584<br>DOF: 0.543<br>Lighting: 0.161<br>Emphasis: 0.61<br>Repetition:0/057<br>Rule of thirds: 0.082<br>Symmetry: 0.042<br>Vivid: 0.341<br><br>Global Score: 0.69 |

300A

| Output Image | Aesthetic Values |
|---|---|
|  | Balancing: 0.056<br>Harmony: 0.41<br>Content: 0.585<br>DOF: 0.5683<br>Lighting: 0.207<br>Emphasis: 0.642<br>Repetition:0.072<br>Rule of thirds: 0.085<br>Symmetry: 0.048<br>Vivid: 0.454<br><br>Global Score: 0.84 |

300D

600

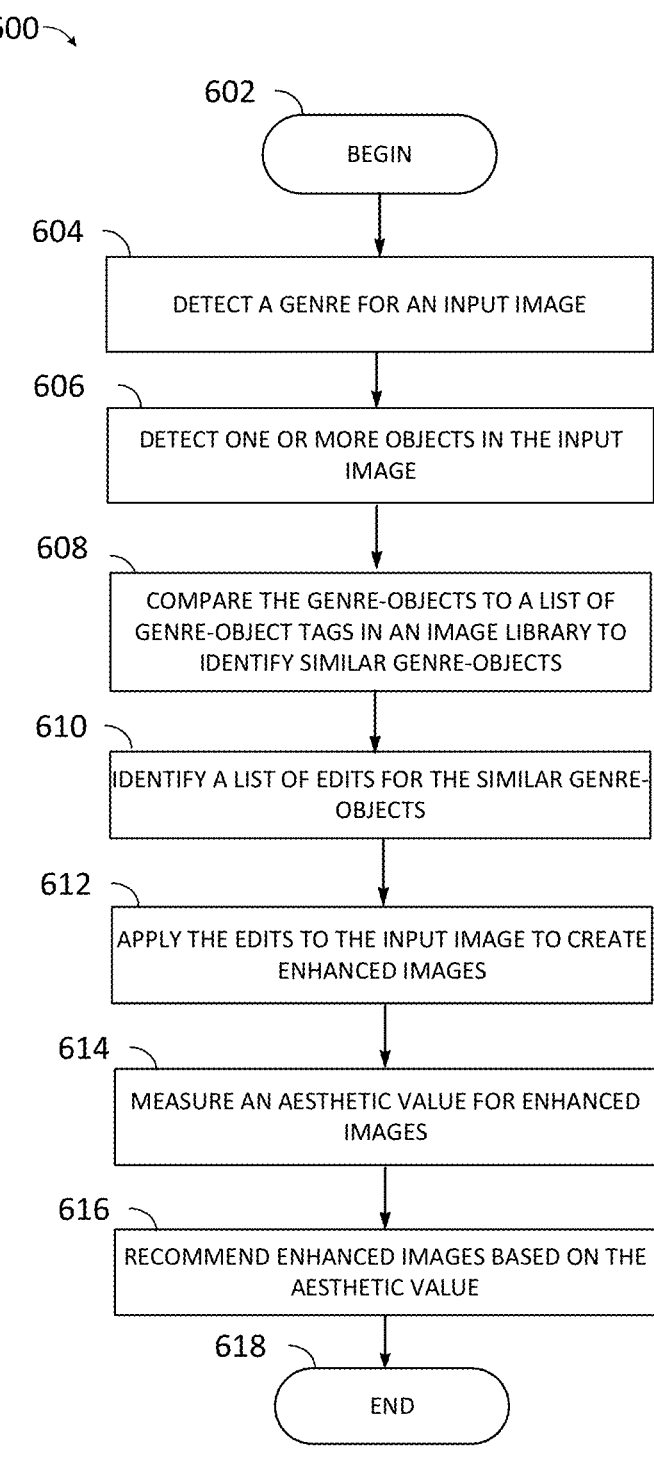

602

BEGIN

604

DETECT A GENRE FOR AN INPUT IMAGE

606

DETECT ONE OR MORE OBJECTS IN THE INPUT IMAGE

608

COMPARE THE GENRE-OBJECTS TO A LIST OF GENRE-OBJECT TAGS IN AN IMAGE LIBRARY TO IDENTIFY SIMILAR GENRE-OBJECTS

610

IDENTIFY A LIST OF EDITS FOR THE SIMILAR GENRE-OBJECTS

612

APPLY THE EDITS TO THE INPUT IMAGE TO CREATE ENHANCED IMAGES

614

MEASURE AN AESTHETIC VALUE FOR ENHANCED IMAGES

616

RECOMMEND ENHANCED IMAGES BASED ON THE AESTHETIC VALUE

618

END

INTELLIGENT SYSTEM AND METHOD OF ENHANCING IMAGES

BACKGROUND

In recent years, use of digital images in many areas of work and personal life has significantly increased. Many users utilize digital images to create documents and work products, participate in social media, memorialize their experiences and/or share their experiences with others. Users often capture digital images using a digital device (e.g., mobile phone camera) and utilize the captured images directly from the capturing device. For example, a user may take a picture and proceed to post the image to a social media site or to share it via text message or other type of communication with others. Many users do not have the time and/or the required proficiency level in digital image editing applications to be able to enhance an image before they use it. As a result, many of the images that are used by users are not high-quality images.

To address this issue, some applications have developed image transformation filters that can quickly transform the original image to a filtered version. Many applications offer numerous filters for the user to choose from. The filters are a standard set of filters that are offered as editing options for all images. While this provides an avenue for users to quickly edit their images, due to the large number of filters, and the fact that the same filters are offered for all images, the users often find it difficult to select an appropriate filter for their image. Furthermore, the standard filters do not always result in enhancements to an image. In fact, in many instances, the standard filters do not provide desired enhancements.

Hence, there is a need for improved systems and methods of offering enhancement to images.

SUMMARY

In one general aspect, the instant disclosure presents a data processing system having a processor and a memory in communication with the processor wherein the memory stores executable instructions that, when executed by the processor, cause the data processing system to perform multiple functions. The functions include detecting a genre for an input image using a genre identification machine-learning model; identifying one or more objects in the input image using an object identification machine-learning model; comparing the identified genre and the identified one or more objects to a list of genre and object tags for images in an image library to identify a plurality of genre and object tags that are similar to the identified genre and the identified one or more objects; identifying a list of edits corresponding to each of the identified plurality of genre and object tags; applying the list of edits to the input image to generate a plurality of enhanced images for the input image; measuring an aesthetic value for one or more of the plurality of enhanced images; and recommending, based on the aesthetic value, at least one of the one or more of the plurality of enhanced images as a recommendation for enhancing the input image, wherein when new editing features are made available as enhancements, the list of edits is automatically updated using a self-learning mechanism to enable use of the new editing features in enhancing the input image.

In yet another general aspect, the instant disclosure presents a method for automatically enhancing an input image. In some implementations, the method includes detecting a genre for the input image using a genre identification machine-learning model and identifying one or more objects in the input image using an object identification machine-learning model. The identified genre and objects are then compared to a list of genre and object tags for images in an image library to identify a plurality of genre and object tags that are similar to the identified genre and objects. A list of edits corresponding to each of the identified similar genre and object tags is then applied to the input image to generate a plurality of enhanced images for the input image. An aesthetic value is measured for the plurality of enhanced images and at least one of the plurality of enhanced images is provided as a recommendation for enhancing the input image, based on the aesthetic value.

In a further general aspect, the instant application describes a non-transitory computer readable medium on which are stored instructions that when executed cause a programmable device to perform functions of accessing a library of images, each image in the library having an associated enhanced version of the image; detecting a genre for each of a plurality of the images using a genre identification machine-learning model; identifying one or more objects in each of the plurality of the images using an object identification machine-learning model; using the identified genres and the identified one or more objects to cluster the images into a plurality of genre-object tags; identifying a list of edits that were applied to the images in each of the plurality of genre-object tags; identifying one or more edits corresponding to each of the identified plurality of genre and object tags; creating, based on the identified one or more edits, a list of edits for each of the plurality of genre-object tags; and utilizing the list of edits in automatically enhancing an input image.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 6 is a flow diagram depicting an example method for automatically providing an enhancement recommendation for enhancing an input image.

DETAILED DESCRIPTION

Figure 1:
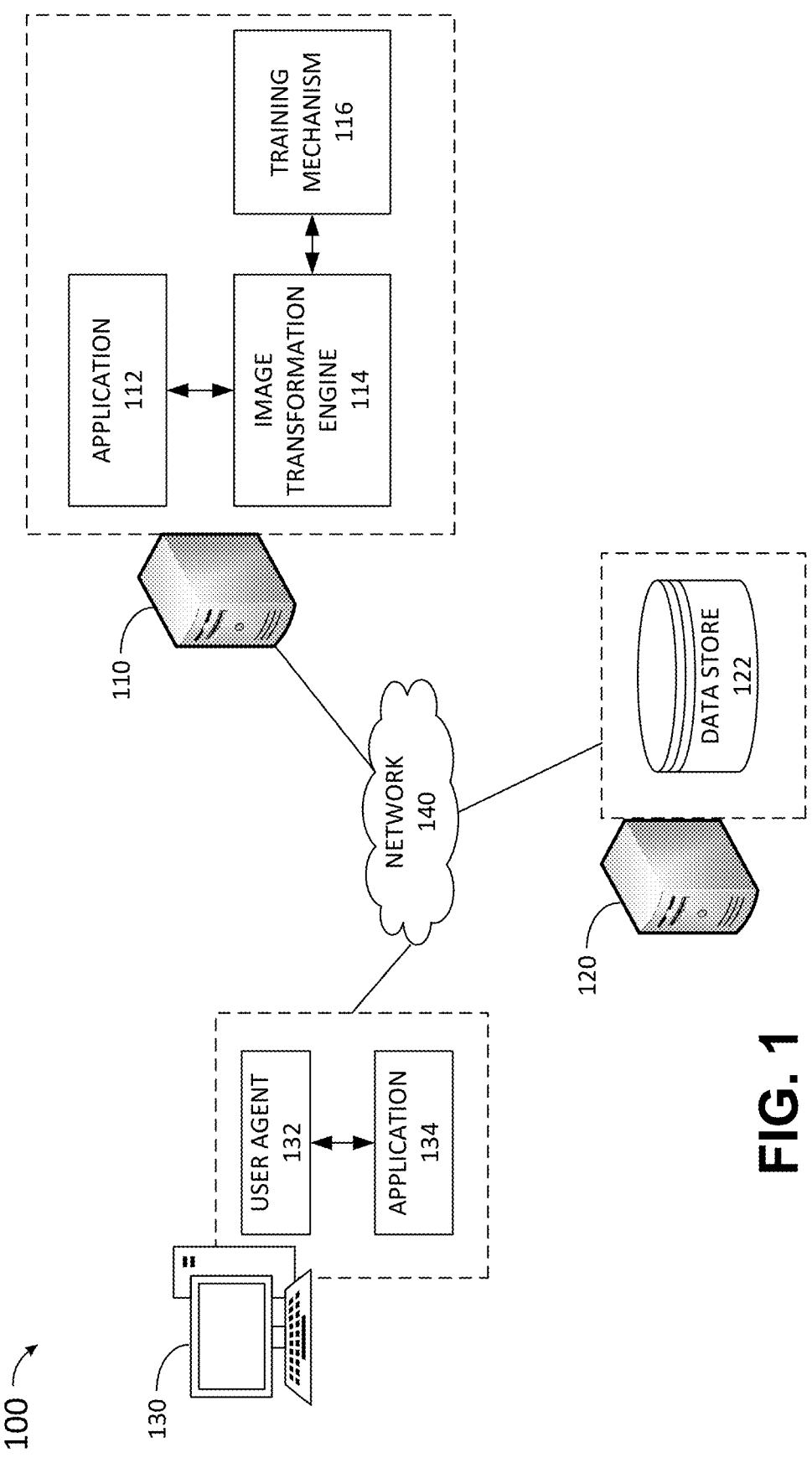
FIG. 1 depicts an example system upon which aspects of this disclosure may be implemented.

With the advancement of digital camera equipment and its integration in everyday mobile computing devices such as mobile phones, more and more users captures many digital images on a daily basis and utilize these images in a variety of different ways. To assist users in capturing and utilizing digital images, many image editing tools have been developed to assist users in editing and improving the images. These image editing tools enable users to turn images into creative outputs rather than just a photo by applying a wide variety of image filters and/or adjustment tools. These image editing tools cater to many types of users, from a novice who only knows how to do basic editing to a professional user who can utilize the tools to significantly transform an input image. While there are some professional users who use advanced features of such image editing tools, most users utilize a few simple editing features, as it is often difficult to learn and master advance features that can transform the aesthetics of the image.

To enable more users to transform their images using image editing tools, some applications offer theme features to helps user quickly transform their images based on a given theme. Themes are a combination of filters, looks, image adjustment properties, texts, borders, stickers and/or various other parameters that can be applied to, removed from and/or adjusted on an image. By offering themes, the applications provide one touch options for quickly transforming an image. To provide many options for users to choose from, image editing applications that provide themes often offer a large number of pre-defined themes for an input image. However, instead of helping the user, offering many choices to users often results in confusion and frustration, as the user would have to spend a lot of time examining the different options and identifying the best one to use. This results in many users choosing to make their own edits on images instead of utilizing the themes offered by the application. Furthermore, currently available themes are standard pre-defined themes that are offered for any input image. As a result, not all of the themes are equally applicable to a given input image. For example, while a theme may have been developed based on an input image and resulted in a significant aesthetic improvement for that particular image, the same theme may not lead to any aesthetic improvement for a different input image. Yet, because that theme is provided as part of the library of available themes for the application, the theme is still offered as an option for the different input image.

Moreover, applications often develop their pre-defined themes manually by using experts and designers who spend a lot of time developing the themes. This requires a lot of time and is an expensive undertaking. Thus, there exist many technical problems in current image enhancement mechanisms. These technical problems include manual creation of pre-defined themes that are standardized and as such do not result in aesthetic enhancement of all input images. The technical problems also include offering a large number of pre-defined themes to users to choose from which can result in cognitive overload and confusion for the user.

To address these technical problems and more, in an example, this description provides technical solutions for receiving an input image, automatically determining a genre for the image, automatically identifying one or more objects in the image, and automatically selecting one or more image enhancement options based on the determined genre and the identified objects. This is achieved by utilizing a genre identification machine-learning (ML) model that receives the input image as an input and automatically determines the genre of the image as an output. The objects in the image are identified by utilizing an object identification model that identifies objects in images. In some implementations, the genre identification model and object identification model are self-learning ML models.

The identified genre and objects are provided to a comparison engine that compares the identified genre and identified objects to images in an image enhancement library to identify images that closely resemble the input image. Themes that have been identified as being effective for the identified images in the image enhancement library are then applied to the input image to generate one or more output images. Aesthetic parameters indicating aesthetic value of the image are then measured on the input and output images to determine aesthetic qualities of the images, and output images having higher improvements in aesthetic values are identified as recommendations for enhancements to the image. The recommendations are provided to the user for easy selection. This results in a self-learning mechanism for automatically enhancing images that applies creative themes suitable for the context of the input image to enhance the image.

The technical solution described herein addresses the technical problem of inability of current mechanisms to provide enhancement options that are suitable for a given input image. The technical solution provides a few customized image enhancement options that are selected based on the genre and/or identified objects in the input image. The enhancement options are also selected based on an aesthetic value such that the recommended enhancement options are those that are most likely to enhance the aesthetics of the image. The technical effects include at least (1) improving the efficiency of automatically enhancing an image; (2) improving the quality and likelihood of enhancing aesthetic characteristics of the image by selecting enhancements based on the characteristics of the image; and (3) improving user satisfaction in reducing the number of editing options presented to the user, while offering higher quality enhancement options.

As will be understood by persons of skill in the art upon reading this disclosure, benefits and advantages provided by such implementations can include, but are not limited to, a technical solution to the technical problems of lack of mechanisms for offering efficient and customizable image enhancement options for an input image. Technical solutions and implementations provided herein offer a mechanism for selecting enhancement options based on the characteristics of the input image and selecting from the enhancement options those that are likely to result in greater aesthetic improvement. The benefits made available by these technology-based solutions provide a user-friendly mechanism for automatically enhancing images.

As used herein, the term "image enhancement," or "enhancement" refers to image editing options such as image filters, resizing, changing color characteristics, adding/removing text, adding/removing borders and the like that can be used to transform a digital image to a revised variant of the same digital image. The term "theme" as used herein refers to a collection of image editing options that are selected for quick application to an input image.

FIG. 1 illustrates an example system 100, upon which aspects of this disclosure may be implemented. The system 100 includes a server 110, which itself includes an application 112, an image transformation engine 114, and a training mechanism 116. While shown as one server, the server 110 may represent a plurality of servers that work together to deliver the functions and services provided by each service or application included in the server 110. The server 110 may also operate as a cloud-based server for offering image transformation services in one or more applications such as application 112 and/or application 134. The server 110 may also operate as a shared resource server located at an enterprise accessible by various computer client devices such as a client device 130.

The server 110 includes and/or executes an image transformation engine 114, which receives and processes a request for automatically enhancing an input image. The request is received from an application such as the application 112 or 134. The request may be an explicit request submitted by a user via a user interface (UI) associated with the application 112 or 134. For example, the user may have captured an image via a digital camera or may have opened a previously stored image and may submit a request for editing the image. Alternatively, the request is transmitted automatically via the application 112 or 134 to provide automatic image enhancement recommendations to the user. For example, a user may automatically be presented with image enhancement recommendations when the user attempts to attach an email to a message or post the image to a social media site. In either scenario, the request includes a copy of the input image. Once the request is received, the image transformation engine 114 examines the input image to identify a genre and one or more objects in the input image. This is achieved by utilizing one or more trained ML models that perform genre and object identification. The internal structure of and data flow between the various elements of the image transformation engine 114 is discussed in greater detail with respect to FIG. 2.

One or more ML models implemented by the image transformation engine 114 are trained by the training mechanism 116. The training mechanism 116 may use training data sets stored in the data store 122 to provide initial and ongoing training for each of the models. Alternatively, or additionally, the training mechanism 116 may use training data sets from elsewhere. In some implementations, the training mechanism 116 uses labeled training data to train one or more of the models via deep neural network(s) or other types of ML models. In other implementations, the training mechanism 116 uses unlabeled training data. The initial training may be performed in an offline stage. Additionally, and/or alternatively, the one or more ML models may be trained using batch learning.

As a general matter, the methods and systems described herein may include, or otherwise make use of one or more ML model to generate one or more output images based on an input image. ML generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to identify patterns in images to identify objects in an image. Such training may be made following the accumulation, review, and/or analysis of data. Such data is configured to provide the ML algorithm (MLA) with an initial or ongoing training set. In addition, in some implementations, a user device can be configured to transmit data captured locally during use of relevant application(s) to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. Moreover, different training approaches may be used for training different ML models, such as, but not limited to, selection of training, validation, and test sets of training data, ordering and/or weighting of training data items, or numbers of training iterations. One or more of the resulting multiple trained ML models is selected based on factors such as, but not limited to, accuracy, computational efficiency, and/or power efficiency. In some implementations, a single trained ML model is produced.

The training data may be occasionally updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

In collecting, storing, using and/or displaying any user data used in training ML models, care may be taken to comply with privacy guidelines and regulations. For example, options may be provided to seek consent (e.g., opt-in) from users for collection and use of user data, to enable users to opt-out of data collection, and/or to allow users to view and/or correct collected data.

The system 100 includes a server 120 which may be connected to or include the data store 122 which functions as a repository in which databases relating to training models and libraries of image enhancements are stored. Although shown as a single data store, the data store 122 is representative of multiple storage devices and data stores which may be accessible by one or more of the image transformation engine 114, training mechanism 116, and application 112.

The client device 130 is connected to the server 110 via a network 140. The network 140 may be a wired or wireless network(s) or a combination of wired and wireless networks that connect one or more elements of the system 100. The client device 130 may be a personal or handheld computing device having or being connected to input/output elements that enable a user to interact with various applications (e.g., application 112 or application 134). Examples of suitable client devices 130 include but are not limited to personal computers, desktop computers, laptop computers, mobile telephones, smart phones, tablets, phablets, smart watches, wearable computers, gaming devices/computers, televisions, and the like. The internal hardware structure of a client device is discussed in greater detail with respect to FIGS. 7 and 8.

The client device 130 includes a local application 134. The application 134 is a computer program executed on the client device that configures the device to be responsive to user input to allow a user to interactively create, edit, and/or review an image. The application 134 may also enable the user to interactively submit a request for enhancing an input. Examples of suitable applications include, but are not limited to, a presentation application, design application, social media application, and image editing application.

In some examples, the application used to submit a request for automatic image enhancement is executed on the server 110 (e.g., application 112) and provided via an online service. In some implementations, web applications communicate via the network 140 with a user agent 132, such as a browser, executing on the client device 130. The user agent 132 may provide a UI that allows the user to interact with the application 112. Image data from the application 134 or application 112 is provided via the network 140 to the image transformation engine 114 for use in generating image enhancement recommendations.

In some implementations, the client device 130 includes a local image transformation engine for performing offline image enhancements. The local image transformation engine may be a light (e.g., simplified) version of the image transformation engine 114 that enables automatic image enhancement locally. In an example, the local image transformation engine receives an input image, utilizes a light version of the genre and object identification ML models, and utilizes a locally stored image enhancement library or accesses a remotely located enhancement library to identify suitable enhancements based on the identified genre and objects.

Figure 2:
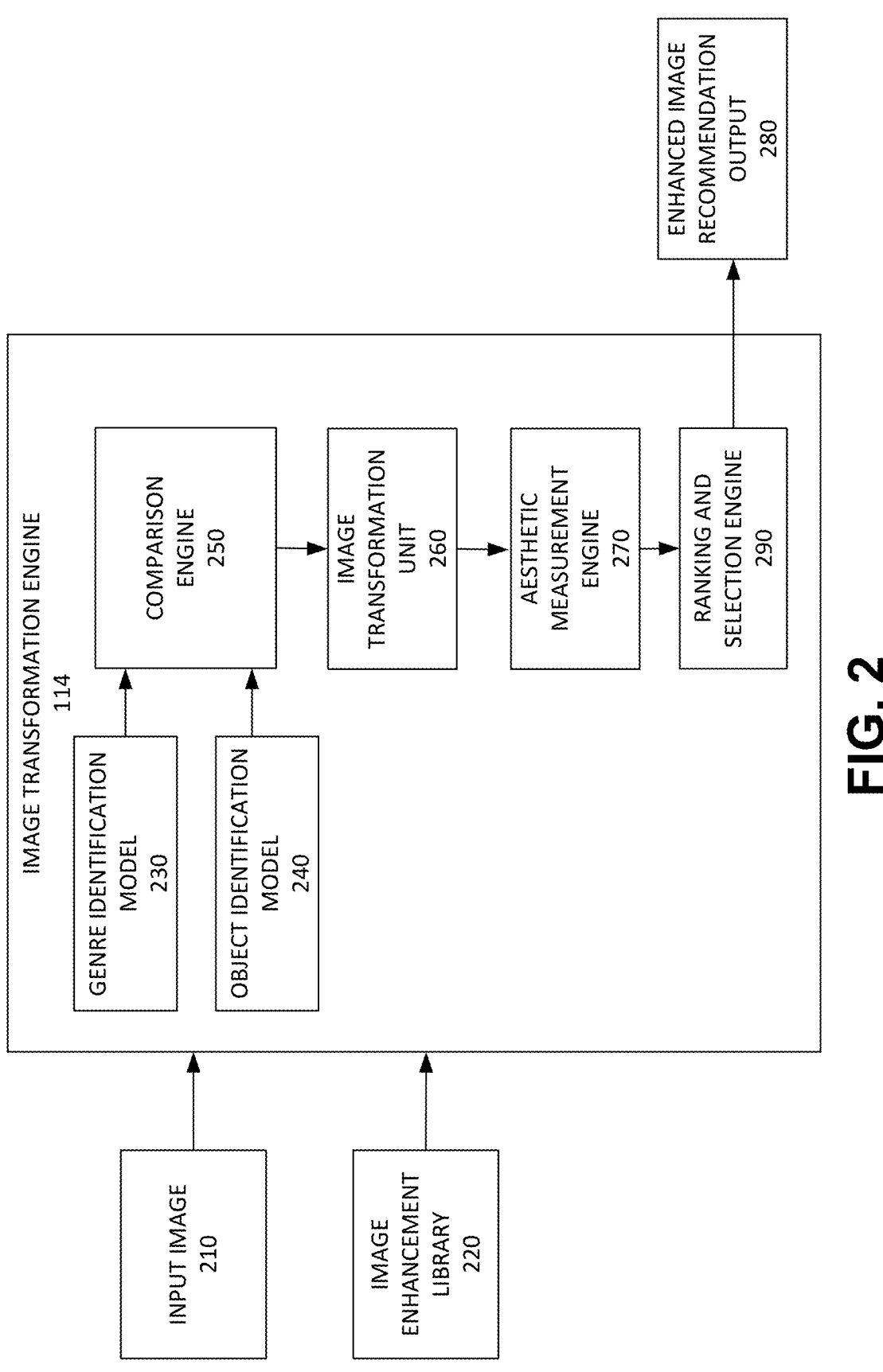
FIG. 2 depicts an example of some elements involved in automatically generating image enhancement options for an input image.

FIG. 2 depicts an example of some elements involved in automatically generating image enhancement options for an input image. Once an input image is determined as requiring enhancement (e.g., via explicit user request or an automatic determination based on context), a request for providing enhancement recommendations for the input image is submitted to the image transformation engine 114. The request may include the input image 210 or the image transformation engine 114 may retrieve the input image 210 upon receiving the request. Once received, the image transformation engine 114 utilizes a genre identification model 230, object identification model 240, comparison engine 250, image transformation unit 260 and aesthetic measurement engine 270 to process the received input image 210 and generate an enhanced image recommendation output 280.

The input image 210 is provided to the genre identification model 230. The genre identification model 230 examines the input image 210 to identify a genre for the input image 210. In some implementations, the genre identification model 230 is a deep-learning multi-class classification model. To train the genre identification model 230 to classify images as belonging to a classification genre, a pretrained complex convolutional neural network model is trained using a dataset of labeled images to predict which genre from a predefined set of image genres an image can be classified as. The set of image genres may include nature, portrait, animals, food, people, fashion, life events, buildings and the like. For an input image, the genre identification model 230 determines a confidence score for the input image for each of the predefined genres and selects one or more of the genres having the highest confidence scores as the genre of the input image.

The input image 210 is also provided to the object identification model 240 to identify one or more objects in the input image 210. This provides more details about the input image, thus enabling more relevant enhancement recommendations. To achieve this, the object identification model 240 may examine the properties of various elements in the input image to identify characteristics of the objects in the input image 210, compare those characteristics to characteristics of known objects and determine which known objects the elements in the input image 210 correspond with. In some implementations, the object identification model 240 is a Faster R-CNN deep convolution neural network. The Faster R-CCN network is a network that is trained for object detection.

In some implementations, a pretrained object detection neural network is trained on an open image dataset for detecting objects in images. In an example, a total of 518 object classes are used during the training. Examples of objects that may be found in a nature image are trees, mountains, rivers, valley, plants, waterfalls, lakes and the like. Each of these objects may define an object class. The pretrained object detection neural network is fine-tuned using a data set of images that are labeled with a predefined set of objects. For example, an image in the image data set may be labeled as corresponding with trees, mountains and plants. Once trained, the object identification model 240 can examine the input image 210 to identify one or more objects, from among a set of predefined objects, in the input image 210. The object identification model 240 determines a confidence score for each of the identified images. Based on the determined confidence scores, one or more of the objects identified in the input image 210 are used as object tags for the input image 210. In some implementations, this involves selecting objects that have confidence scores that exceed a predetermine threshold (e.g., a confidence score above 0.6) as object tags for the input image 210.

Once the genre and the object tags of the input image 210 have been determined, the genre-object tag(s) combination of the input image 210 is provided to the comparison engine 250 for comparing with the genre-object tags in the image enhancement library 220. The image enhancement library 220 includes a list of genre-object tags extracted from a large number of pairs of before and after enhancement images. The after-enhancement images are selected based on aesthetic values such that enhancements that have resulted in improvement in aesthetic values are used. As discussed in further detail below with respect to FIG. 4, the genre-object tags in the image enhancement library include associated best edit lists. As a result, the comparison engine 250 can quickly compare the genre-object tags of the input image 210 with the genre-object tags of the images in the image enhancement library 220 to identify the genre-object tags that are closely associated with the genre-object tags of the input image 210. Edits corresponding to the identified genre-object tags of the image enhancement library 220 are then identified. Those edits are provided to an image transformation unit 260 to transform the input image 210.

The image transformation unit 260 applies each edit set separately to the input image 210 to create a set of potential enhancement recommendations. This results in a number of potential output images. To ensure that only output images that improve the aesthetic characteristics of the input image 210 are provided as recommendations, the transformed output images are provided to an aesthetic measurement engine 270. The aesthetic measurement engine 270 determines an aesthetic value for each of the transformed output images. The aesthetic value is an image quality measurement value. The value may be determined using a deep learning image aesthetic predictor model. In an example, the deep-learning model is a convolution neural network (CNN) that determines a global aesthetic value along with a number of (e.g., 10) aesthetic parameter values for any input image. The aesthetic parameters include interesting content, object emphasis, good lighting, symmetry, vividness, harmony, balancing and the like. The parameters may be predetermined and selected based on attributes that are more likely to correspond with high quality images. The CNN model may be trained to receive an image as an input and provide the determined aesthetic parameter values as an output. The global aesthetic value is determined using an average of the measured aesthetic attribute values. In some examples, the global aesthetic value is a weighted average of one or more of the measured aesthetic parameter values.

The determined aesthetic values of the transformed output images are used to rank and select output recommendations from the transformed output images. In some implementations, this is achieved via a ranking and selection unit 290. The ranking and selection unit 290 orders the transformed output images in a descending order of their aesthetic values to get an ordered list of transformed outputs. In some implementations, the global aesthetic value of each transformed output image is compared against a threshold aesthetic value and only transformed images having global aesthetic values that exceed the threshold aesthetic value are selected as potential recommendations. In an example, the threshold aesthetic values is the measured aesthetic value of the input image 210. This ensures that the users are presented with recommendations that result in outputs images having higher quality than the input image.

The ordered and/or filtered list of transformed output images is then provided as the enhanced image recommendation output 280. The enhanced image recommendation output 280 may be transmitted back to the application from which the request for image enhancement was received for display to the user. In an example, the enhanced image recommendation output 280 includes a list of the selected transformed output images. The transformed images are then presented to the user for selection. The user can select any of the transformed images in a one click (or one touch) operation to quick select an enhancement option.

Figure 3A:
FIGS. 3A-3D depict example genre identification and aesthetics value measurements for an example image and an enhanced version of the example image.
Figure 3B:

FIG. 3A depicts an example image 300A which may be provided as an input image to an image transformation engine. The image 300A may be a picture captured by the user or any other image the user is utilizing and/or editing. Once the image 300A is provided as an input image to an image transformation engine for automatic enhancement, the engine first identifies a genre for the image. The identified genre for image 300A may be nature or landscape. In addition to identifying the genre, the image transformation engine also identifies objects within the image 300B. This is depicted in FIG. 3B which illustrates some of the objects identified in the image 300A along with their confidence scores. As depicted, mountains, valley, river and trees are identified as objects in the image 300A. Mountains have a confidence score of 0.78 indicating that the model attributed a high likelihood for the presence of mountains in the image 300A. Similarly, valley has a confidence score of 078. Trees have a slightly lower confidence score of 0.74, while river has the lowest confidence score. This demonstrates how various objects in an image may be identified with determined confidence scores to categorize an image.

Figure 3C:
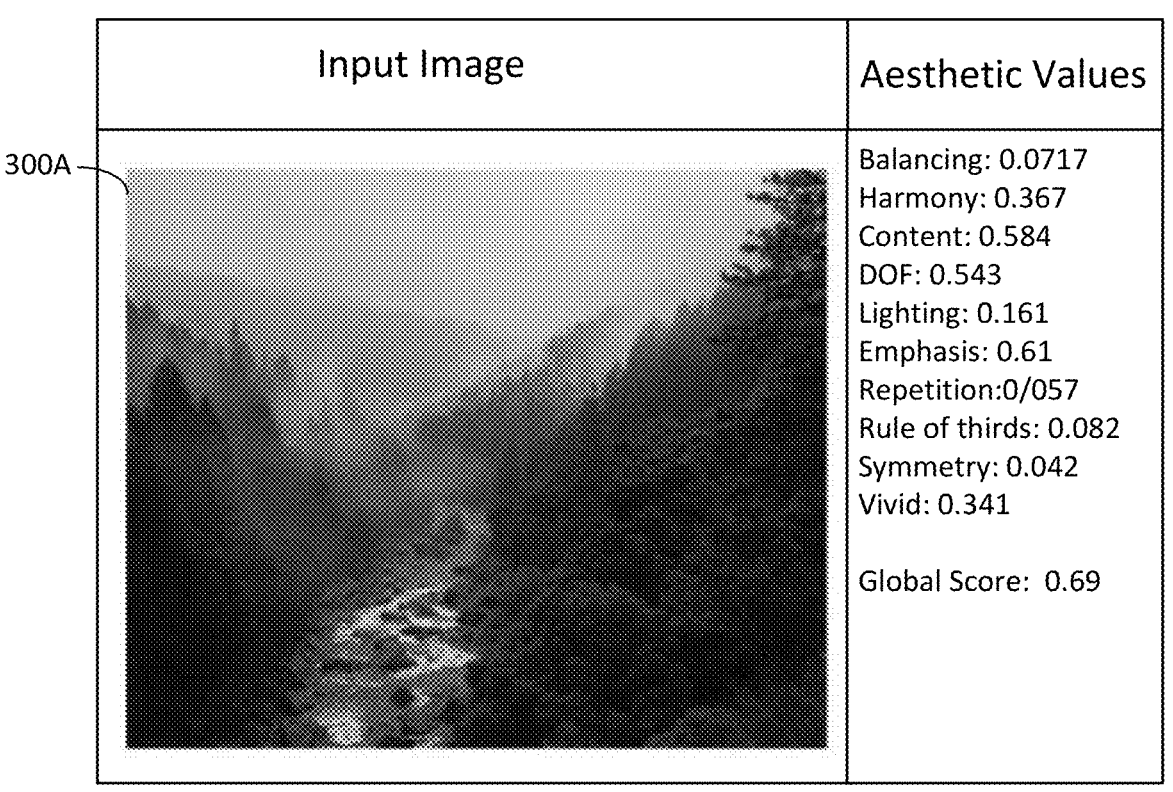
Figure 3D:
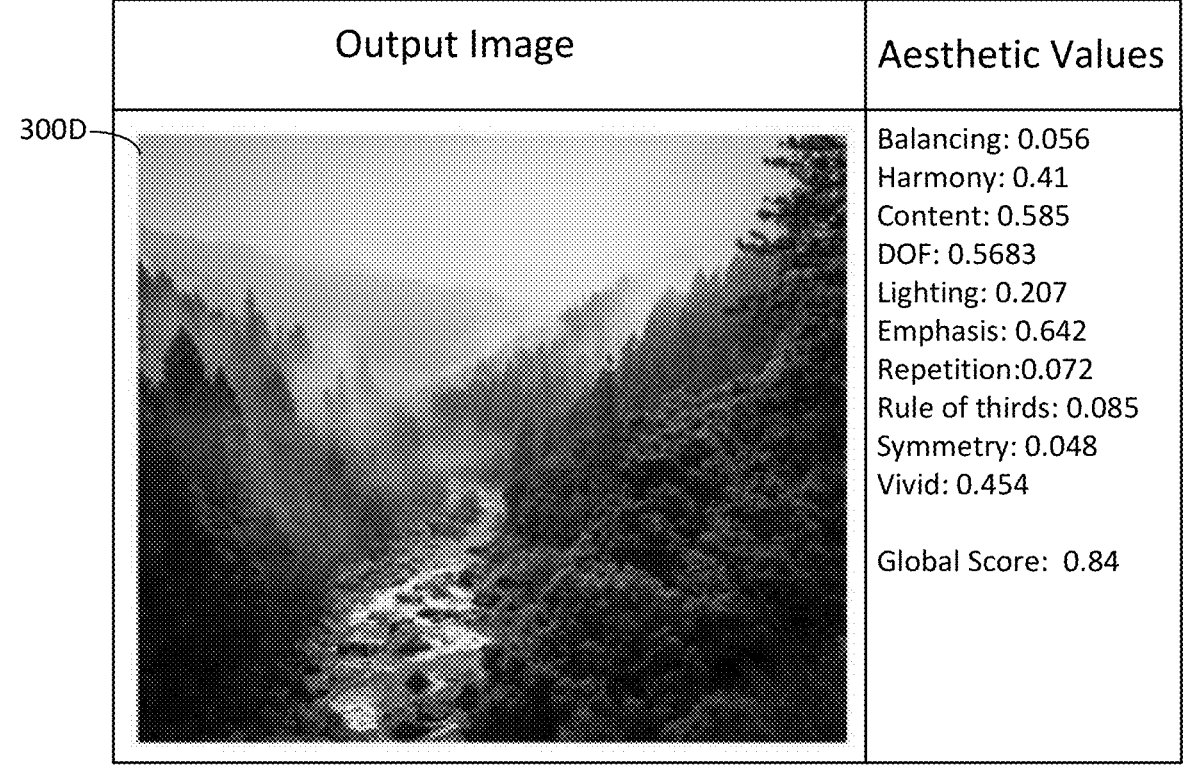

As part of the process of automatically enhancing an image, aesthetic values are determined for both the original image and the enhanced versions of the image to determine if an enhanced version actually provides better aesthetic characteristics. FIG. 3C depicts the input image 300A along with determined aesthetic values for various aesthetic characteristics of the input image. These characteristics include balancing, harmony, content, depth of field (DOF), lighting, emphasis, repetition, rule of thirds, symmetry, and vividness. In addition, FIG. 3C depicts the determined total global aesthetic value which is 0.69. FIG. 3D depicts an output image 300D that is generated from the input image 300A. The output image 300D is an enhanced version of the input image 300A. To ensure that the output image 300D provides better aesthetic characteristics than the input image 300A, various aesthetic characteristics of the output image 300D are also determined, as displayed in FIG. 3D. The global aesthetic value for the output image 300D indicates that the aesthetic value of the output image 300D improved significantly over the aesthetic value of the input image 300C. This indicates that the output image 300D is in fact enhanced as compared to the original image. This process ensures that only edits that in fact result in an improvement in quality of the image are suggested to the user.

Figure 4:
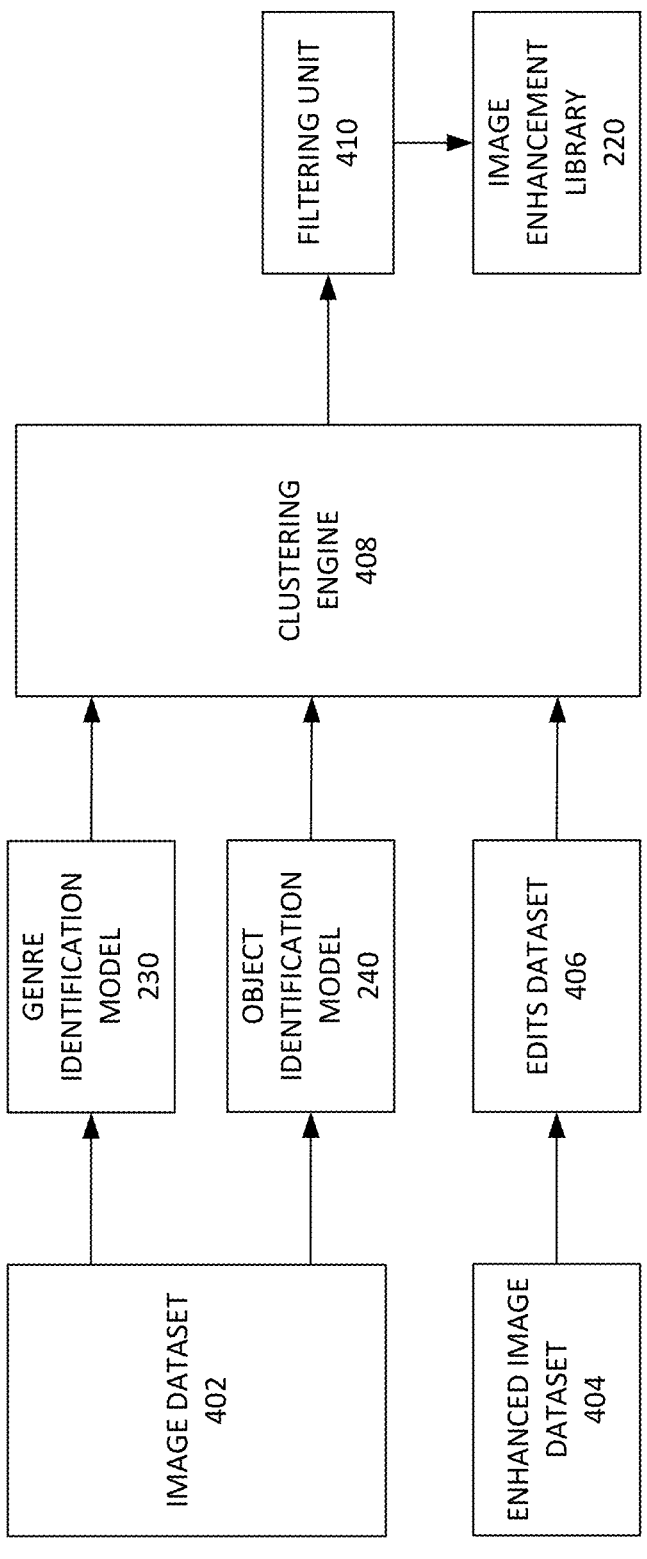
FIG. 4 depicts an example of some elements involved in creating an image enhancement library.

FIG. 4 depicts an example of some elements involved in creating an image enhancement library. As discussed above, in order to provide enhancement suggestions that are suitable for each specific type of image, a library of images and their associated enhanced versions is provided. This library is referred to as an image enhancement library in this disclosure. To create the image enhancement library, an image dataset 402 is first generated. The image dataset 402 may be created by collecting a large number of (e.g., hundreds or thousands of images) of images for which enhancements have been generated. This may be a collection of manually enhanced images (e.g., image enhancements created by designers and the like). The collection of images may also include user enhanced images (e.g., images that are enhanced by various users' use of image editing tools). The enhanced version of the images are collected in an enhanced image dataset 404. In some implementations, both the original images and their enhanced versions are collected in the same dataset with are stored with identifying labels (e.g., original, enhanced).

To ensure that the images are selected in correspondence with the categories of images for which enhancements are being provided, the images in the image enhancement library may be selected from the pre-defined genres which are later used to categorize an input image (e.g., nature, landscape, food, portrait, fashion, life events, people, and the like). Once the images are collected, the images in the image dataset 402 are provided to the genre identification model 230 for identifying a genre for each image in the image dataset 402. The genre identification model 230 operates as discussed above, to identify one or more genres for the images in the image dataset 402. One or more genres having a confidence score that exceeds a predetermined threshold are selected as the genre of each image. In some implementations, the genre having the highest confidence scores is selected as the genre.

In addition to the identifying the genre, objects in the images are also identified using the object identification model 240. As discussed above, the object identification model 240 examines an image to detect one or more objects that are present in the image. The object identification model 240 determines a confidence score for one or more objects detected in the image. For example, in an image showing a scene of mountains, trees, and a river, the object identification model 240 provides a list of mountains with a confidence score of 0.8, trees with a confidence score of 0.7 and a river with a confidence score of 0.56. Objects having a confidence score that exceeds a predetermined threshold are identified as the objects associated with the image. This results in images of the image dataset 402 having genre-object tags.

The categorized images are then transmitted to a clustering engine 408 for clustering the genre-object tags into a number of classes based on the closeness of the tags. To achieve this, the clustering engine 408 first creates separate clusters for groups of images having the same genre and similar or same objects tags. For example, for the nature genre, an image 1 having the object tags of mountain, river, trees and valley is clustered into the same group as image 2 having the object tags of valley, ocean, rock and grass. This is done to decrease the number of possible object-tag sets such that an input image can be more quickly compared against the images in the image library. As such, the images in the image dataset 402 are clustered into N classes of clusters, with N being a predetermined number of clusters. In an example, N is 10, such that for each type of genre, the images are clustered into 10 clusters.

In some implementations, to determine whether two genre-object sets are similar enough to be clustered into the same group, the clustering engine 408 utilizes the k-means clustering algorithm. This is done by using vector quantization and representing an object-tag set as a vector space model, where each object-tag set is a set of identifiers. Then, term frequency weights of the vector space are determined and chosen as identifiers. Cosine similarity is then used between two vectors representing different object-tag sets to determine the similarity between the two object-tag sets. Depending on the similarity, the object-tag sets may be clustered into the same group. In this manner, the k-clustering algorithm can cluster the genre-object tags into a defined number of classes. In an alternative implementation, the clustering engine 408 clusters the genre-object tags based on semantics similarity. Once the clusters are created, the tags for each genre can be grouped together such that for each genre has N object tag sets.

In some implementations, images in the enhanced image dataset 404 are compared against the original images in the image dataset 402 to extract the set of edits used to enhance each image in the image dataset 404. These edits are stored in the edits dataset 406 and transmitted to the clustering engine 408 for clustering of the edits. In other implementations, the edits are already included in the enhanced image dataset 404 or image dataset 402 so that extraction of the edits is not required. Moreover, in some implementations, the edits are stored as part of the image dataset 402 and/or enhanced image dataset 404.

Once the object tags for each genre are grouped together, the edits for the images in the set are grouped together based on similarity. This may be done in a similar manner as the clustering of the object-tags. Using k-means clustering on the edit lists and determining similarity based on the number of same edits in the 2 edit lists, the edits can be grouped together, if individual edits in the two edit lists are nearly the same. In this manner, k-means is used to represent the edit-list as a vector of 1-0, where 1 indicates an edit has been used, and 0 indicates that the edit has not been used. This results in P classes of edit lists. Next, from among the clustered edit lists, edit lists that result in higher aesthetic value improvements are selected. This requires that aesthetic values be determined for the original images in the image dataset 402 and for the enhanced images in the image dataset 404. This may be achieved by utilizing an aesthetic measurement engine such as the aesthetic measurement engine 270 of FIG. 2. As a result, only those images in the image dataset having enhanced versions that indicate significant improvement in quality are selected for the enhancement library.

The result is transmitted to a filtering unit 410 for further examination. The resulting image sets are examined by the filtering unit 410 to ensure that the images in the list are not too similar. This is because with many possible best output edit-lists, it is possible some of the edit lists may result in the similar or nearly the same output (e.g., enhancements). The filtering unit 410 may utilize a trained ML model that receives two images as an input and provides a similarity score as an output. The similarity score indicates a similarity between the two input images. By using this model, images in the selected set of enhanced images are examined to remove one of every two images that have a similarity score greater than a threshold value. This ensures that we have visually different enhancement recommendations.

In some implementations, after the filtering, the remaining images are used to create a list of genre-object tag combinations and their corresponding edit sets. This list is stored in the image enhancement library 220 for quick access and comparison with input images such that when an input image having a specific genre and identified object tags is received, the genre-object tags can be compared with the genre-object tags of the image enhancement library 220 to identify suitable edit set options for enhancing the image.

In some implementations, one or more of the ML models in the image transformation engine, the clustering engine and/or the filtering unit are self-learning models that learn from enhancements selected by the users. For example, when new types of editing features are added to an editing application, new themes are developed, or new enhanced images are added to the image dataset, the system of FIG. 4 can quickly and efficiently extract the new edits from the enhanced images and add those to the list of edits in the image enhancement library for future use. This enables automatic learning of new editing features and updating the edit list using a self-learning model to create creative outputs using the new edits. The image enhancement library 220 may also be updated, when users utilize image editing tools to edit their images. In some implementations, user data is collected, when users personally edit images, and/or when some editing tools become more popular, or a new editing tool is being used, or simply to add more data to the image enhancement library 220, image enhancement data is collected from user's editing operations and used via the system of FIG. 4 to edit and add to the image enhancement library 220. In this manner, the image enhancement library 220 continues to automatically learn and stay relevant.

Figure 5:
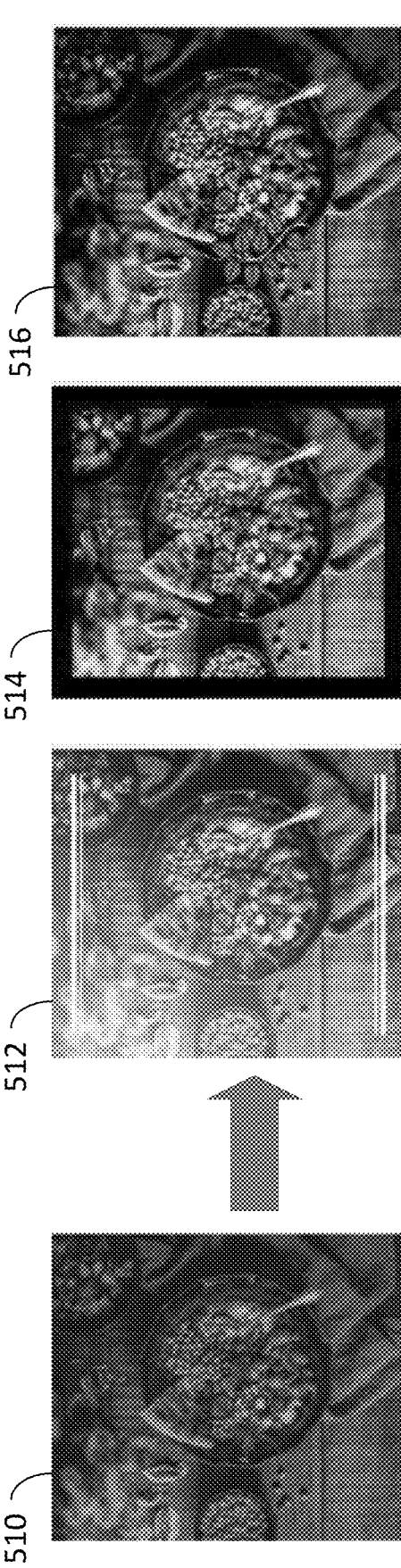
FIG. 5 depicts an example input image and enhancement recommendations provided by an application or service that offers automatic enhancement recommendations for an input image.

FIG. 5 depicts an example input image and enhancement recommendations provided by an application or service that offers automatic enhancement recommendations for an input image. Image 510 in the FIG. 5 represents an input image that is captured by a user or is being reviewed, used and/or edited by a user. Once an indication is received that the image requires enhancement, enhancement options 512, 514 and 516 are automatically generated and presented to the user as recommendations. As depicted, each of the enhancements includes a variety of edits. For example, enhancement option 512 displays adjustments in color as well as the addition of white bars. Enhancement option 514 includes a black border in addition to changes in color and contrast, while enhancement option 516 displays a completely different look by changing the color and texture of the image. The input image 510 can be automatically edited in accordance with one of the enhancement options by simply selecting (e.g., clicking on or touching) any of the enhancement options 512, 514 or 516. In this manner, creative themes that are customized in accordance with the context and content of the image are applied to the input image to offer relevant and high-quality enhancement options.

FIG. 6 is a flow diagram depicting an exemplary method 600 for automatically enhancing an input image. One or more steps of the method 600 may be performed by an image transformation engine such as the image transformation engine 114 of FIGS. 1-2, by a local image transformation engine and/or an application such as applications 112/134 of FIG. 1. The method 600 may begin, at 602, and proceed to detect a genre for an input image, using a genre identification model, at 604. This may occur, for example, when a user submits a request to receive image enhancement recommendations. The request may include a copy of the input image provided via a client device.

One or more objects in the input image are detected using an object identification model, at 606. The identified genre and objects are then compared against a list of genre-object tags in an image library, at 608, to identify a set of genre-object tags that are similar to the identified genre and objects of the input image. Once similar genre-object tags in the image library are identified, a list of edits for the similar genre-object tags is identified, at 610. The list of edits are edits that were applied to images having similar genre and objects. These edits are also edits that results in higher aesthetic improvements and are thus more likely to aesthetically improve the input image.

The list of edits for each similar genre-object tag in the image library is then applied to the input image, at 612, to create one or more enhanced images for the input image. An aesthetic value is then measured for each of the enhanced images, at 614. In some implementations, an aesthetic value is also measured for the input image. The aesthetic value is used to recommend one or more of the enhanced images as recommended enhanced images, at 616, before method 600 ends, at 618.

Figure 7:
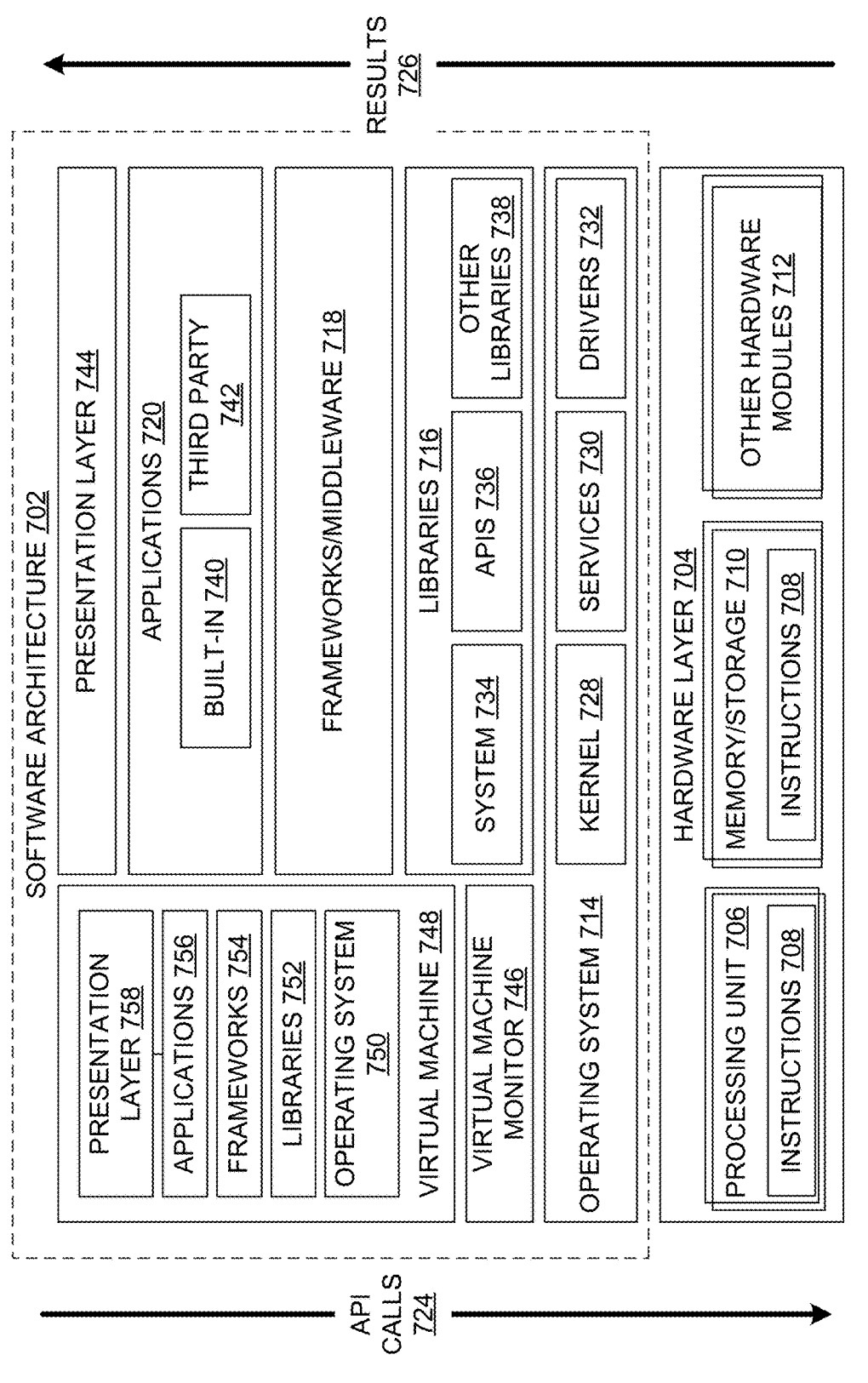
FIG. 7 is a block diagram illustrating an example software architecture, various portions of which may be used in conjunction with various hardware architectures herein described.

FIG. 7 is a block diagram 700 illustrating an example software architecture 702, various portions of which may be used in conjunction with various hardware architectures herein described, which may implement any of the above-described features. FIG. 7 is a non-limiting example of a software architecture and it will be appreciated that many other architectures may be implemented to facilitate the functionality described herein. The software architecture 702 may execute on hardware such as client devices, native application provider, web servers, server clusters, external services, and other servers. A representative hardware layer 704 includes a processing unit 706 and associated executable instructions 708. The executable instructions 708 represent executable instructions of the software architecture 702, including implementation of the methods, modules and so forth described herein.

The hardware layer 704 also includes a memory/storage 710, which also includes the executable instructions 708 and accompanying data. The hardware layer 704 may also include other hardware modules 712. Instructions 708 held by processing unit 706 may be portions of instructions 708 held by the memory/storage 710.

The example software architecture 702 may be conceptualized as layers, each providing various functionality. For example, the software architecture 702 may include layers and components such as an operating system (OS) 714, libraries 716, frameworks 718, applications 720, and a presentation layer 744. Operationally, the applications 720 and/or other components within the layers may invoke API calls 724 to other layers and receive corresponding results 726. The layers illustrated are representative in nature and other software architectures may include additional or different layers. For example, some mobile or special purpose operating systems may not provide the frameworks/middleware 718.

The OS 714 may manage hardware resources and provide common services. The OS 714 may include, for example, a kernel 728, services 730, and drivers 732. The kernel 728 may act as an abstraction layer between the hardware layer 704 and other software layers. For example, the kernel 728 may be responsible for memory management, processor management (for example, scheduling), component management, networking, security settings, and so on. The services 730 may provide other common services for the other software layers. The drivers 732 may be responsible for controlling or interfacing with the underlying hardware layer 704. For instance, the drivers 732 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 716 may provide a common infrastructure that may be used by the applications 720 and/or other components and/or layers. The libraries 716 typically provide functionality for use by other software modules to perform tasks, rather than rather than interacting directly with the OS 714. The libraries 716 may include system libraries 734 (for example, C standard library) that may provide functions such as memory allocation, string manipulation, file operations. In addition, the libraries 716 may include API libraries 736 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 716 may also include a wide variety of other libraries 738 to provide many functions for applications 720 and other software modules.

The frameworks 718 (also sometimes referred to as middleware) provide a higher-level common infrastructure that may be used by the applications 720 and/or other software modules. For example, the frameworks 718 may provide various graphic user interface (GUI) functions, high-level resource management, or high-level location services. The frameworks 718 may provide a broad spectrum of other APIs for applications 720 and/or other software modules.

The applications 720 include built-in applications 740 and/or third-party applications 742. Examples of built-in applications 740 may include, but are not limited to, a contacts application, a browser application, a location application, a media application, a messaging application, and/or a game application. Third-party applications 742 may include any applications developed by an entity other than the vendor of the particular system. The applications 720 may use functions available via OS 714, libraries 716, frameworks 718, and presentation layer 744 to create user interfaces to interact with users.

Some software architectures use virtual machines, as illustrated by a virtual machine 748. The virtual machine 748 provides an execution environment where applications/modules can execute as if they were executing on a hardware machine (such as the machine depicted in block diagram 800 of FIG. 8, for example). The virtual machine 748 may be hosted by a host OS (for example, OS 714) or hypervisor, and may have a virtual machine monitor 746 which manages operation of the virtual machine 748 and interoperation with the host operating system. A software architecture, which may be different from software architecture 702 outside of the virtual machine, executes within the virtual machine 748 such as an OS 750, libraries 752, frameworks 754, applications 756, and/or a presentation layer 758.

Figure 8:
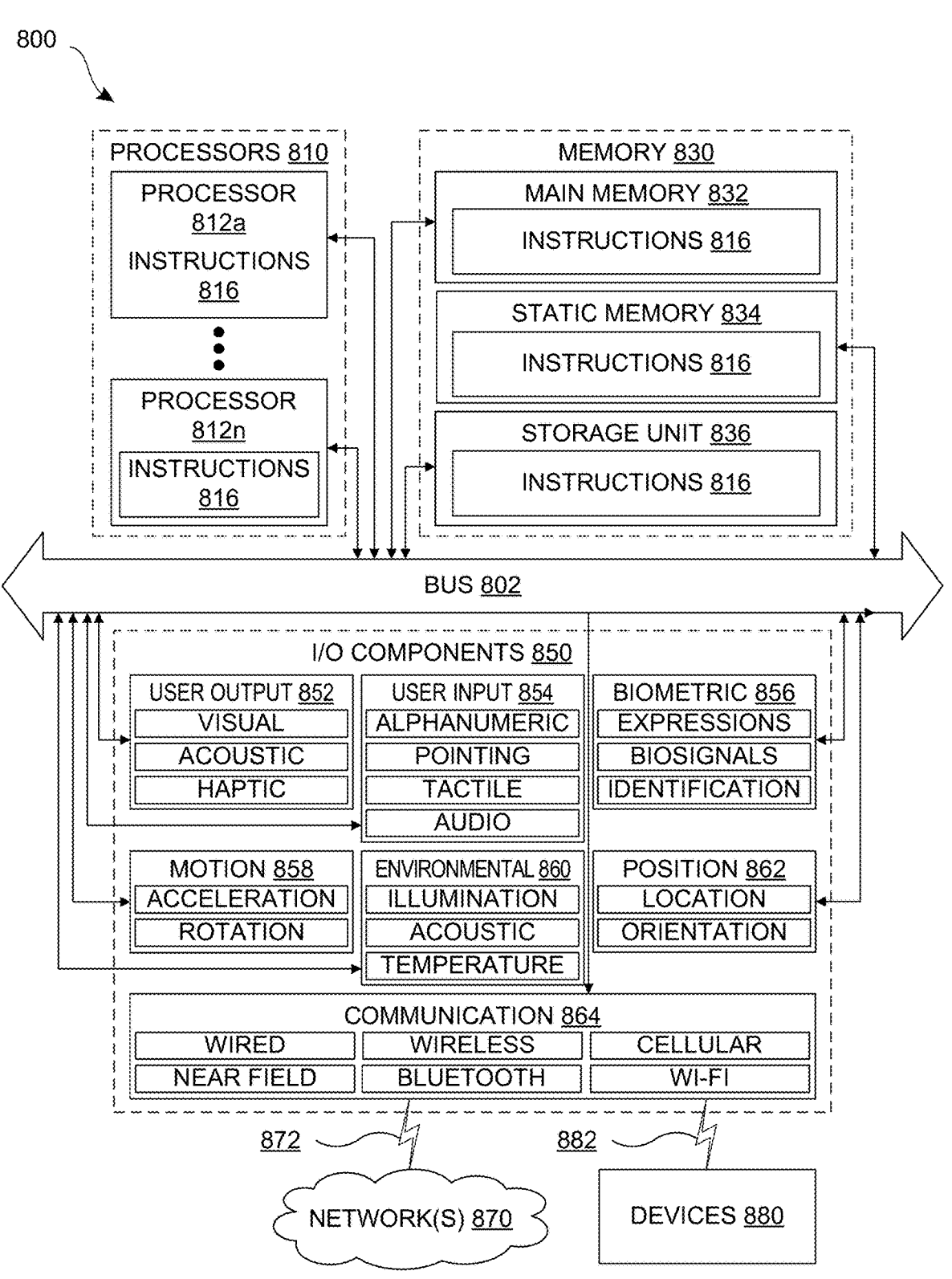
FIG. 8 is a block diagram illustrating components of an example machine configured to read instructions from a machine-readable medium and perform any of the features described herein.

FIG. 8 is a block diagram illustrating components of an example machine 800 configured to read instructions from a machine-readable medium (for example, a machine-readable storage medium) and perform any of the features described herein. The example machine 800 is in a form of a computer system, within which instructions 816 (for example, in the form of software components) for causing the machine 800 to perform any of the features described herein may be executed. As such, the instructions 816 may be used to implement methods or components described herein. The instructions 816 cause unprogrammed and/or unconfigured machine 800 to operate as a particular machine configured to carry out the described features. The machine 800 may be configured to operate as a standalone device or may be coupled (for example, networked) to other machines. In a networked deployment, the machine 800 may operate in the capacity of a server machine or a client machine in a server-client network environment, or as a node in a peer-to-peer or distributed network environment. Machine 800 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 800 is illustrated, the term "machine" includes a collection of machines that individually or jointly execute the instructions 816.

The machine 800 may include processors 810, memory 830, and I/O components 850, which may be communicatively coupled via, for example, a bus 802. The bus 802 may include multiple buses coupling various elements of machine 800 via various bus technologies and protocols. In an example, the processors 810 (including, for example, a central processing unit (CPU), a graphics processing unit (GPU), a digital signal processor (DSP), an ASIC, or a suitable combination thereof) may include one or more processors 812a to 812n that may execute the instructions 816 and process data. In some examples, one or more processors 810 may execute instructions provided or identified by one or more other processors 810. The term "processor" includes a multi-core processor including cores that may execute instructions contemporaneously. Although FIG. 8 shows multiple processors, the machine 800 may include a single processor with a single core, a single processor with multiple cores (for example, a multi-core processor), multiple processors each with a single core, multiple processors each with multiple cores, or any combination thereof. In some examples, the machine 800 may include multiple processors distributed among multiple machines.

The memory/storage 830 may include a main memory 832, a static memory 834, or other memory, and a storage unit 836, both accessible to the processors 810 such as via the bus 802. The storage unit 836 and memory 832, 834 store instructions 816 embodying any one or more of the functions described herein. The memory/storage 830 may also store temporary, intermediate, and/or long-term data for processors 810. The instructions 816 may also reside, completely or partially, within the memory 832, 834, within the storage unit 836, within at least one of the processors 810 (for example, within a command buffer or cache memory), within memory at least one of I/O components 850, or any suitable combination thereof, during execution thereof. Accordingly, the memory 832, 834, the storage unit 836, memory in processors 810, and memory in I/O components 850 are examples of machine-readable media.

As used herein, "machine-readable medium" refers to a device able to temporarily or permanently store instructions and data that cause machine 800 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 816) for execution by a machine 800 such that the instructions, when executed by one or more processors 810 of the machine 800, cause the machine 800 to perform and one or more of the features described herein. Accordingly, a "machine-readable medium" may refer to a single storage device, as well as "cloud-based" storage systems or storage networks that include multiple storage apparatus or devices.

The I/O components 850 may include a wide variety of hardware components adapted to receive input, provide output, produce output, transmit information, exchange information, capture measurements, and so on. The specific I/O components 850 included in a particular machine will depend on the type and/or function of the machine. For example, mobile devices such as mobile phones may include a touch input device, whereas a headless server or IoT device may not include such a touch input device. The particular examples of I/O components illustrated in FIG. 8 are in no way limiting, and other types of components may be included in machine 800. The grouping of I/O components 850 are merely for simplifying this discussion, and the grouping is in no way limiting. In various examples, the I/O components 850 may include user output components 852 and user input components 854. User output components 852 may include, for example, display components for displaying information (for example, a liquid crystal display (LCD) or a projector), acoustic components (for example, speakers), haptic components (for example, a vibratory motor or force-feedback device), and/or other signal generators. User input components 854 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 850 may include biometric components 856, motion components 858, environmental components 860 and/or position components 862, among a wide array of other environmental sensor components. The biometric components 856 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 862 may include, for example, location sensors (for example, a Global Position System (GPS) receiver), altitude sensors (for example, an air pressure sensor from which altitude may be derived), and/or orientation sensors (for example, magnetometers). The motion components 858 may include, for example, motion sensors such as acceleration and rotation sensors. The environmental components 860 may include, for example, illumination sensors, acoustic sensors and/or temperature sensors.

The I/O components 850 may include communication components 864, implementing a wide variety of technologies operable to couple the machine 800 to network(s) 870 and/or device(s) 880 via respective communicative couplings 872 and 882. The communication components 864 may include one or more network interface components or other suitable devices to interface with the network(s) 870. The communication components 864 may include, for example, components adapted to provide wired communication, wireless communication, cellular communication, Near Field Communication (NFC), Bluetooth communication, Wi-Fi, and/or communication via other modalities. The device(s) 880 may include other machines or various peripheral devices (for example, coupled via USB).

In some examples, the communication components 864 may detect identifiers or include components adapted to detect identifiers. For example, the communication components 864 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 864, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-8) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:

a processor; and a memory in communication with the processor, the memory comprising executable instructions that, when executed by the processor, cause the data processing system to perform functions of:

detecting a genre for an input image using a genre identification machine-learning model;

identifying one or more objects in the input image using an object identification machine-learning model;

comparing the identified genre and the identified one or more objects to a list of genre and object tags for images in an image library to identify a plurality of genre and object tags that are similar to the identified genre and the identified one or more objects;

identifying a list of edits corresponding to each of the identified plurality of genre and object tags;

applying the list of edits to the input image to generate a plurality of enhanced images for the input image;

measuring an aesthetic value for one or more of the plurality of enhanced images; and recommending, based on the aesthetic value, at least one of the one or more of the plurality of enhanced images as a recommendation for enhancing the input image, wherein when new editing features are made available as enhancements, the list of edits is automatically updated using a self-learning mechanism to enable use of the new editing features in enhancing the input image.

Item 2. The data processing system of item 1, wherein the memory further comprises executable instructions that, when executed by the processor, cause the data processing system to perform functions of measuring an aesthetic value for the input image.

Item 3. The data processing system of item 2, wherein the aesthetic value for the input image is compared against the aesthetic value for the enhanced images and enhanced images having an aesthetic value that exceeds the aesthetic value of the input image are provided as the recommendation.

Item 4. The data processing system of any preceding item, wherein recommending, based on the aesthetic value, at least one of the one or more of the plurality of enhanced images as the recommendation includes recommending the enhanced image, when the aesthetic value of the enhanced image exceeds a threshold value.

Item 5. The data processing system of any preceding item, wherein the aesthetic value is used in ranking the enhanced images.

Item 6. The data processing system of item 5, wherein the ranking is used in ordering the enhanced images when recommendations are presented to a user.

Item 7. The data processing system of any preceding item, wherein self-learning mechanism includes identifying genre-object tags to which a new editing feature applies and adding the new editing feature as an edit to the list of edits for the genre-object tags.

Item 8. The data processing system of any preceding item, wherein a user can select a recommended enhanced image to automatically transform the input image into the enhanced image.

Item 9. A method for automatically enhancing an input image comprising:

receiving a request over a communication network to enhance the input image;

detecting a genre for the input image via a genre identification machine-learning model;

identifying one or more objects in the input image via an object identification machine-learning model;

comparing the identified genre and the identified one or more objects to a list of genre-object tags for images in a library of genre-object tags associated with enhanced images to identify a plurality of genre-object tags that are similar to the identified genre and the identified one or more objects;

applying one or more edits associated with the plurality of genre-objects tags to the input image to generate a plurality of enhanced images for the input image;

measuring an aesthetic value for one or more of the plurality of enhanced images; and recommending, based on the aesthetic value, at least one of the one or more of the plurality of enhanced images as a recommendation for enhancing the input image, wherein when new editing features are made available as enhancements, the list of edits is automatically updated using a self-learning mechanism to enable use of the new editing features in enhancing the input image.

Item 10. The method of item 9, further comprising measuring an aesthetic value for the input image.

Item 11. The method of item 10, wherein the aesthetic value for the input image is compared against the aesthetic value for the enhanced images and only enhanced images having an aesthetic value that is higher than the aesthetic value of the input image are provided as the recommendation.

Item 12. The method of any of items 9-11, wherein recommending, based on the aesthetic value, at least one of the one or more of the plurality of enhanced images as the recommendation for enhancing the input image includes recommending the enhanced image, when the aesthetic value of the enhanced image exceeds a threshold value.

Item 13. The method of any of items 9-12, wherein aesthetic value is used in ranking the enhanced images.

Item 14. The method of item 13, wherein the ranking is used in ordering the enhanced images when recommendations are presented to a user.

Item 15. The method of any of items 9-14, wherein self-learning mechanism includes identifying genre-object tags to which a new editing feature applies and adding the new editing feature as an edit to the list of edits for the genre-object tags.

Item 16. The method of nay of items 9-15, wherein a user can select a recommended enhanced image to automatically enhance the input image in accordance with the selected enhanced image.

Item 17. A non-transitory computer readable medium on which are stored instructions that, when executed, cause a programmable device to perform functions of:

accessing a library of images, each image in the library having an associated enhanced version of the image;

detecting a genre for each of a plurality of the images using a genre identification machine-learning model;

identifying one or more objects in each of the plurality of the images using an object identification machine-learning model;

using the identified genres and the identified one or more objects to cluster the images into a plurality of genre-object tags;

identifying a list of edits that were applied to the images in each of the plurality of genre-object tags;

identifying one or more edits corresponding to each of the identified plurality of genre and object tags;

creating, based on the identified one or more edits, a list of edits for each of the plurality of genre-object tags; and utilizing the list of edits in automatically enhancing an input image.

Item 18. The non-transitory computer readable medium of item 17, wherein when new editing features are made available as enhancements, the list of edits is automatically updated using a self-learning mechanism to enable use of the new editing features in enhancing the input image.

Item 19. The non-transitory computer readable medium of item 18, wherein self-learning mechanism includes identifying genre-object tags to which a new editing feature applies and adding the new editing feature as an edit to the list of edits for the genre-object tags.

Item 20. The non-transitory computer readable medium of any of items 17-19, wherein a filtering unit is utilized to filter out images in the library of images that have a similarity value that exceeds a threshold.

In the foregoing detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
a processor; and
a memory in communication with the processor, the memory comprising executable instructions that, when executed by the processor, cause the data processing system to perform functions of:
identifying a genre for an input image using a genre identification machine-learning model;
identifying one or more objects in the input image using an object identification machine-learning model;
comparing the identified genre and the identified one or more objects to a list of genre and object tags for images in an image library to identify a plurality of genre and object tags that are similar to the identified genre and the identified one or more objects, the tags for the images in the image library indicating edits to the images of the image library, the edits comprising at least two of: image filtering, resizing, changing color characteristics, adding text, removing text, adding borders and removing borders;
identifying a list of edits corresponding to each of the identified plurality of genre and object tags;
applying the list of edits to the input image to generate a plurality of enhanced images for the input image;
measuring an aesthetic value for one or more of the plurality of enhanced images; and
recommending, based on the aesthetic value, at least one of the one or more of the plurality of enhanced images as a recommendation for an enhanced version of the input image,
wherein, when new editing features are made available as enhancements, the list of edits is automatically updated using a self-learning mechanism to enable use of the new editing features in enhancing the input image.

2. The data processing system of claim 1, wherein the memory further comprises executable instructions that, when executed by the processor, cause the data processing system to perform functions of measuring an aesthetic value for the input image.

3. The data processing system of claim 2, wherein the aesthetic value for the input image is compared against the aesthetic value for the enhanced images and enhanced images having an aesthetic value that exceeds the aesthetic value of the input image are provided as the recommendation.

4. The data processing system of claim 1, wherein recommending, based on the aesthetic value, at least one of the one or more of the plurality of enhanced images as the recommendation includes recommending the enhanced image, when the aesthetic value of the enhanced image exceeds a threshold value.

5. The data processing system of claim 1, wherein the aesthetic value is used in ranking the enhanced images.

6. The data processing system of claim 5, wherein the ranking is used in ordering the enhanced images when recommendations are presented to a user.

7. The data processing system of claim 1, wherein self-learning mechanism includes identifying genre-object tags to which a new editing feature applies and adding the new editing feature as an edit to the list of edits for the genre-object tags.

8. The data processing system of claim 1, wherein a user can select a recommended enhanced image to automatically transform the input image into the enhanced image.

9. A method for automatically enhancing an input image comprising:

receiving a request over a communication network to enhance the input image;

identifying a genre for the input image via a genre identification machine-learning model;

identifying one or more objects in the input image via an object identification machine-learning model;

comparing the identified genre and the identified one or more objects to a list of genre-object tags for images in a library of genre-object tags associated with enhanced images to identify a plurality of genre-object tags that are similar to the identified genre and the identified one or more objects, the tags for the images in the image library indicating edits to the images of the image library, the edits comprising at least two of:

image filtering, resizing, changing color characteristics, adding text, removing text, adding borders and removing borders;

applying one or more edits associated with the plurality of genre-objects tags to the input image to generate a plurality of enhanced images for the input image;

measuring an aesthetic value for one or more of the plurality of enhanced images; and recommending, based on the aesthetic value, at least one of the one or more of the plurality of enhanced images as a recommendation for an enhanced version of the input image, wherein, when new editing features are made available as enhancements, a list of edits is automatically updated using a self-learning mechanism to enable use of the new editing features in enhancing the input image.

10. The method of claim 9, further comprising measuring an aesthetic value for the input image.

11. The method of claim 10, wherein the aesthetic value for the input image is compared against the aesthetic value for the enhanced images and only enhanced images having an aesthetic value that is higher than the aesthetic value of the input image are provided as the recommendation.

12. The method of claim 9, wherein recommending, based on the aesthetic value, at least one of the one or more of the plurality of enhanced images as the recommendation for enhancing the input image includes recommending the enhanced image, when the aesthetic value of the enhanced image exceeds a threshold value.

13. The method of claim 9, wherein the aesthetic value is used in ranking the enhanced images.

14. The method of claim 13, wherein the ranking is used in ordering the enhanced images when recommendations are presented to a user.

15. The method of claim 9, wherein self-learning mechanism includes identifying genre-object tags to which a new editing feature applies and adding the new editing feature as an edit to the list of edits for the genre-object tags.

16. The method of claim 9, wherein a user can select a recommended enhanced image to automatically enhance the input image in accordance with the selected enhanced image.

17. A non-transitory computer readable medium on which are stored instructions that, when executed, cause a programmable device to perform functions of:

accessing a library of images, each image in the library having an associated enhanced version of the image;

identifying a genre for each of a plurality of the images using a genre identification machine-learning model;

identifying one or more objects in each of the plurality of the images using an object identification machine-learning model;

using the identified genres and the identified one or more objects to cluster the images into a plurality of genre-object tags, the tags for the images in the library of images indicating edits to the images of the library, the edits comprising at least two of: image filtering, resizing, changing color characteristics, adding text, removing text, adding borders and removing borders;

identifying a list of edits that were applied to the images in each of the plurality of genre-object tags;

identifying one or more edits corresponding to each of the identified plurality of genre and object tags;

creating, based on the identified one or more edits, a list of edits for each of the plurality of genre-object tags; and utilizing the list of edits in automatically enhancing an input image.

18. The non-transitory computer readable medium of claim 17, wherein when new editing features are made available as enhancements, the list of edits is automatically updated using a self-learning mechanism to enable use of the new editing features in enhancing the input image.

19. The non-transitory computer readable medium of claim 18, wherein the self-learning mechanism includes identifying genre-object tags to which a new editing feature applies and adding the new editing feature as an edit to the list of edits for the genre-object tags.

20. The non-transitory computer readable medium of claim 17, wherein a filtering unit is utilized to filter out images in the library of images that have a similarity value that exceeds a threshold.

\* \* \* \* \*